US012726432B2

(12) United States Patent
Defilippi et al.

(10) Patent No.: US 12,726,432 B2
(45) Date of Patent: Sep. 1, 2026

(54) SEGMENT COMPACTION IN SEGMENT ROUTING WITH RESILIENCY TO RESTORATION

(71) Applicant: Ciena Corporation, Hanover, MD (US)

(72) Inventors: Todd Defilippi, Redwood City, CA (US); Cengiz Alaettinoglu, Sherman Oaks, CA (US)

(73) Assignee: Ciena Corporation, Hanover, MD (US)

( * ) Notice: Subject to any disclaimer, the term of this patent is extended or adjusted under 35 U.S.C. 154(b) by 232 days.

(21) Appl. No.: 18/489,328

(22) Filed: Oct. 18, 2023

(65) Prior Publication Data

US 2025/0133013 A1 Apr. 24, 2025

(51) Int. Cl.
*H04L 45/28* (2022.01)
*H04L 45/02* (2022.01)

(52) U.S. Cl.
CPC .............. *H04L 45/28* (2013.01); *H04L 45/02* (2013.01)

(58) Field of Classification Search
CPC ................................ H04L 45/02; H04L 45/28
See application file for complete search history.

(56) References Cited

U.S. PATENT DOCUMENTS

| | | | |
|---|---|---|---|
| 7,120,792 B1 | 10/2006 | Jacobson et al. | |
| 7,197,573 B1 | 3/2007 | Jacobson et al. | |
| 7,539,191 B1 | 5/2009 | Jacobson et al. | |
| 8,135,834 B1 | 3/2012 | Jacobson et al. | |
| 8,274,901 B1 | 9/2012 | Casner et al. | |
| 8,422,502 B1 | 4/2013 | Alaettinoglu et al. | |
| 8,937,946 B1 | 1/2015 | Kanna et al. | |
| 9,026,674 B1 | 5/2015 | Kanna et al. | |
| 9,369,371 B2 * | 6/2016 | Filsfils | H04L 43/10 |
| 9,485,150 B2 * | 11/2016 | Filsfils | H04L 41/12 |
| 9,838,246 B1 * | 12/2017 | Hegde | H04L 45/18 |
| 10,757,012 B2 * | 8/2020 | Lazzeri | H04L 45/124 |
| 11,032,197 B2 * | 6/2021 | Nainar | H04L 45/28 |
| 11,057,278 B1 | 7/2021 | Côté et al. | |
| 11,102,109 B1 * | 8/2021 | Narasimhan | H04L 45/28 |
| 11,418,428 B2 * | 8/2022 | Margaria | H04L 45/42 |

(Continued)

FOREIGN PATENT DOCUMENTS

| | | |
|---|---|---|
| EP | 4 254 898 A1 | 10/2023 |
| WO | 2023038818 A1 | 3/2023 |

OTHER PUBLICATIONS

Zahraa N. Abdullah et al. "Segment Routing in Software Defined Networks: A Survey", IEEE Communications Surveys and Tutorials, vol. 21, No. 1, First Quarter 2019, 23 pages. (Year: 2019).*

(Continued)

*Primary Examiner* — G. C. Neurauter, Jr.
(74) *Attorney, Agent, or Firm* — Baratta Law PLLC; Lawrence A. Baratta, Jr.

(57) ABSTRACT

Systems and methods for segment compaction in Segment Routing with resiliency to restoration include, responsive to a path having been computed in a Segment Routing network from a source node to a destination node, assuming all failed links in the Segment Routing network are temporarily restored; and determining a segment list, with all of the failed links assumed temporarily restored, that corresponds to the computed path, such as by preferring node segments over adjacency segments to match the computed path.

17 Claims, 3 Drawing Sheets

(56) References Cited

U.S. PATENT DOCUMENTS

| | | | | |
|---|---|---|---|---|
| 11,677,659 | B2 * | 6/2023 | Sidebottom | H04L 45/24 709/238 |
| 11,695,688 | B2 * | 7/2023 | Sidebottom | H04L 45/123 370/235 |
| 11,777,841 | B2 * | 10/2023 | Alaettinoglu | H04L 45/28 370/225 |
| 11,882,032 | B2 * | 1/2024 | Alaettinoglu | H04L 45/28 |
| 2014/0269422 | A1 | 9/2014 | Filsfils et al. | |
| 2014/0369238 | A1 | 12/2014 | Alaettinoglu et al. | |
| 2016/0057049 | A1 | 2/2016 | Jacobson et al. | |
| 2021/0099378 | A1 | 4/2021 | Alaettinoglu et al. | |
| 2022/0086078 | A1 | 3/2022 | Sivabalan et al. | |
| 2022/0103463 | A1 | 3/2022 | Margaria et al. | |
| 2023/0067946 | A1 | 3/2023 | Alaettinoglu et al. | |
| 2023/0095297 | A1 | 3/2023 | Alaettinoglu et al. | |
| 2023/0098528 | A1 | 3/2023 | Alaettinoglu et al. | |
| 2023/0146226 | A1 | 5/2023 | Sivabalan et al. | |

OTHER PUBLICATIONS

Jan. 31, 2025, International Search Report and Written Opinion for International Patent Application No. PCT/US2024/051435.

* cited by examiner

SEGMENT COMPACTION IN SEGMENT ROUTING WITH RESILIENCY TO RESTORATION

FIELD OF THE DISCLOSURE

The present disclosure relates generally to networking and computing. More particularly, the present disclosure relates to systems and methods for segment compaction in Segment Routing with resiliency to restoration.

BACKGROUND OF THE DISCLOSURE

Segment Routing (SR) is a technology that implements a source routing paradigm. A packet header includes a stack of function identifiers, known as segments, which define an ordered list of functions to be applied to the packet. A segment can represent any instruction, topological, or service-based, and each segment is represented by a Segment Identifier (SID). A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. Segment Routing allows forcing a flow through any topological path and service chain while maintaining a per-flow state only at the ingress node to the Segment Routing domain. Segment Routing is described, e.g., in Fiflsfils et al., RFC 8402, "Segment Routing Architecture," Internet Engineering Task Force (IETF), July 2018, the contents of which are incorporated herein by reference. In Segment Routing, a path includes segments which are instructions a node executes on an incoming packet.

BRIEF SUMMARY OF THE DISCLOSURE

The present disclosure relates to systems and methods for segment compaction in Segment Routing with resiliency to restoration. Segment compaction includes transforming a path through a Segment Routing network into a list of segments such that when the segment list (e.g., SID list) is followed, the same path is traced through the network. When deciding which segments to use, we want to optimize segment list depth (number of segments), resilience to failure, and resilience to repair and other changes. There is a tension between these aspects, and the present disclosure provides an approach to segment compaction that addresses all three of these aspects concurrently. That is, the present disclosure provides an approach to compacting segments (e.g., a SID list) that focuses on simultaneously addressing segment list depth, resilience to failure, and resilience to repair and other changes. The present disclosure provides an approach to determining a segment list in a Segment Routing network after a path has been determined. This segment list optimally addresses segment list depth, resilience to failure, and resilience to repair and other changes, in such a manner that the same path is achieved with the segment list. Generally, the segment compaction includes:

(1) treating all links in the Segment Routing network as up before performing segment compaction, i.e., any down links are treated as being restored for purposes of segment compaction, and (2) attempting to use a node segment to cover as much of the desired path as possible from a current node, and using an adjacency segment only if necessary.

These two approaches lead to a segment list that needs to be monitored and modified less often. The PCE or SDN controller can be confident the segment list will still do its job in the presence of such link restoration, so it will be able to spend more processing time on other requirements.

In various embodiments, the present disclosure includes a method having steps, an apparatus configured to implement the steps, such as a network element, a processing device, a Path Computation Element (PCE), etc., and a non-transitory computer-readable medium storing instructions that, when executed, cause one or more processors, to perform the steps. The steps include, responsive to a path having been computed in a Segment Routing network from a source node to a destination node, assuming all failed links in the Segment Routing network are temporarily restored; and determining a segment list, with all of the failed links assumed temporarily restored, that corresponds to the computed path. The steps can further include providing the segment list as Segment Identifiers (SIDs) to a source node in the Segment Routing network.

The determining can include preferring node segments over adjacency segments to match the computed path. The path can be for a circuit-style service in the Segment Routing network. The determining the segment list can be performed by traversing the computed path from a current node to determine a furthest node segment available matching a corresponding section of the computed path, and, if a furthest node associated with the furthest node segment is not the current node, utilizing the furthest node segment in the segment list. If the furthest node is the current node, the determining the segment list can include selecting an adjacency segment matching a next node from the current node in the computed path.

The determining the segment list can include (a) from a current node that starts with the source node, traversing the computed path to determine a furthest node segment available matching a corresponding section of the computed path; (b) if a furthest node associated with the furthest node segment is not the current node, utilizing the furthest node segment in the segment list; (c) if the furthest node is the current node, utilizing an adjacency segment to get to a next node in the computed path; and (d) setting the current node to be the furthest node or the next node, and repeating (a)-(c) until the furthest node or the next node is the destination node. The steps can further include assuming a service for the computed path is on the computed path for traffic engineering purposes, without continually monitoring the service to ensure it is on the computed path.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
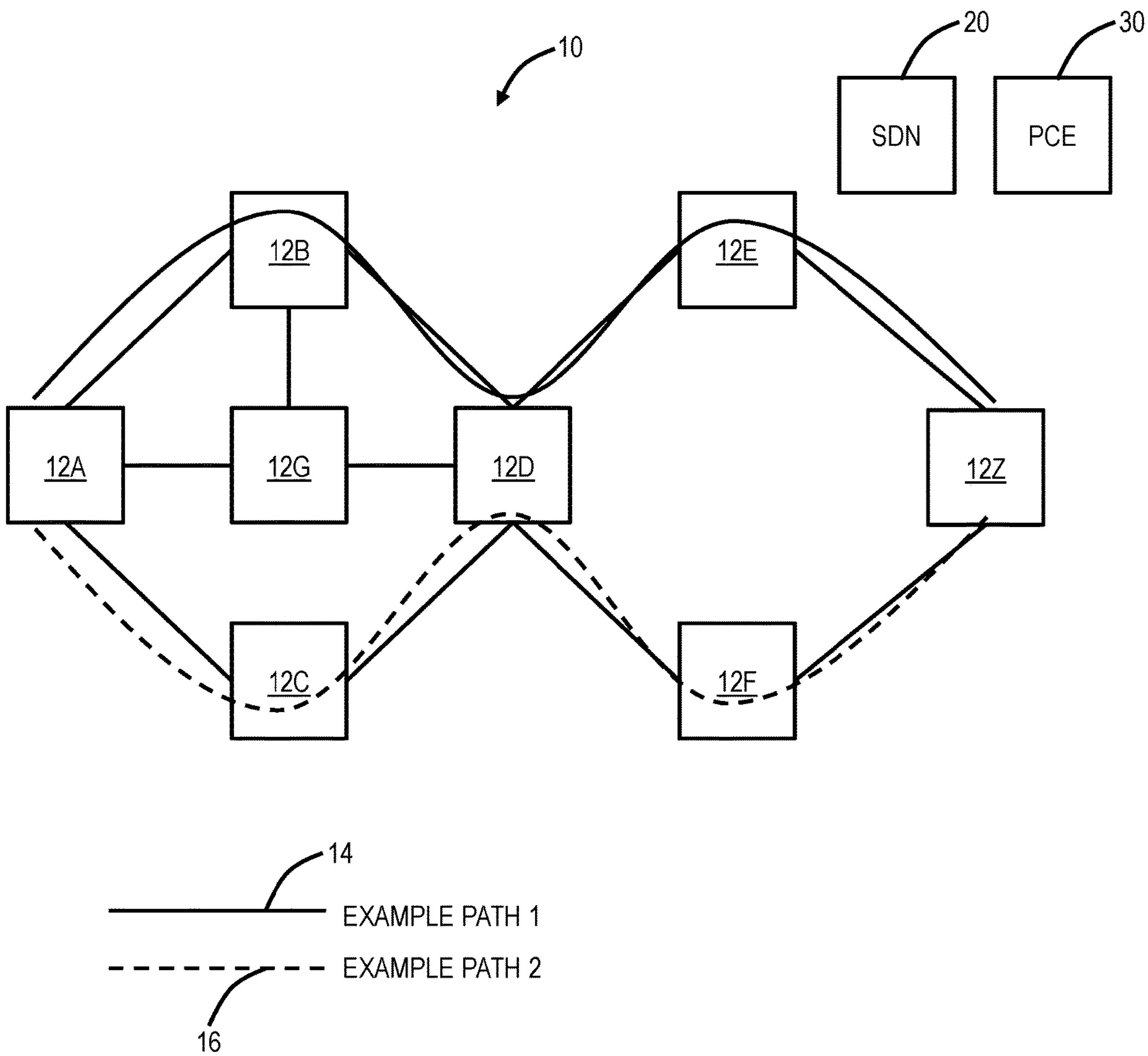
FIG. 1 is a network diagram of a network including network elements illustrating two example paths.

Again, the present disclosure relates to systems and methods for segment compaction in Segment Routing with resiliency to restoration. The present disclosure includes an approach to segment compaction, namely a path has been computed in a Segment Routing network, and segment compaction is a process of assigning segments to the path that maximally guarantee the same computed path is maintained over time. The segment compaction optimizes segment list depth, resilience to failure, and resilience to repair and other changes, in such a way that the PCE or SDN controller does not need to continually monitor the network. The techniques described herein can be used for circuit-style transport in Segment Routing, as well as for providing a SID list for any computed path.

Segment Routing Overview

A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by the SDN model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, RFC 8754, "IPv6 Segment Routing Header (SRH)," March 2020, the contents of both are incorporated by reference. A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for Segment Routing, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path or is provided a path by an SDN controller or PCE, and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forwarding the packet according to the shortest path to the destination, forwarding through a specific interface, or delivering the packet to a given application/service instance). Each Segment can be represented by a Segment Identifier (SID). Note, we may use the terms segment and SID interchangeably herein, and those skilled in the art will appreciate a segment is the actual pair of nodes and associated interfaces in the network whereas the SID is an identification thereof. SIDs are allocated from a Segment Routing Global Block (SRGB) with domain-wide scope and significance, or from a Segment Routing Local Block (SRLB) with local scope. The SRGB includes the set of global segments in the Segment Routing domain. If a node participates in multiple SR domains, there is one SRGB for each SR domain. In SRv6, the SRGB is the set of global SRv6 SIDs in the Segment Routing domain.

A segment routed path is encoded into the packet by building a SID stack or list that is added to the packet. These SIDs are popped by processing nodes, and the next SID is used to decide forwarding decisions. A SID can be one of the following types: an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by Open Shortest Path First (OSPF) or Intermediate System-Intermediate System (ISIS). The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents a Segment Routing policy. A head-end node of the Segment Routing policy binds a Binding SID (BSID) to its policy. When the head-end node receives a packet with an active segment matching the BSID of a local Segment Routing Policy, the head-end node steers the packet into the associated Segment Routing Policy. The BSID provides greater scalability, network opacity, and service independence. Instantiation of the Segment Routing Policy may involve a list of SIDs. Any packets received with an active segment equal to BSID are steered onto the bound Segment Routing Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

An anycast segment is a type of prefix segment that represents an anycast group. An anycast segment/SID is used for policies or protection. When forwarding traffic to an anycast SID, a node processing the forwarding will pick a device from the anycast group, which is the closest. If the closest device from the anycast group goes away, traffic will automatically switch to the next closest device in the anycast group. An anycast SID also enables load balancing and Equal Cost Multipath (ECMP).

Segment Routing Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Element (PCE) (e.g., when paths span across multiple IGP areas/levels).

Example Network

FIG. 1 is a network diagram of a network 10 including network elements 12A, 12B, 12C, 12D, 12E, 12F, 12G, 12Z illustrating two example paths 14, 16. As described herein, the network elements 12 can be nodes, switches, routers, etc. implementing Segment Routing. Assume, for illustration purposes, there is a desire to provide a path between the network elements 12A, 12Z, and assume there is a specific path computation, such as for Traffic Engineering purposes, from the network elements 12A, 12B, 12D, 12E, 12Z. This specific path computation can be performed by an SDN controller 20, a PCE 30, or the like. There is a desire that any segment list match the specific path computation, namely the network elements 12A, 12B, 12D, 12E, 12Z, which is the same as the path 14. In some embodiments, the SDN controller 20 can host the PCE 30 and track available bandwidth and other TE link characteristics on a model of the network topology it maintains.

Segment Lists

In segment compaction, we want to transform the path 14 into a list of segments such that when we follow that segment list we end up tracing the same path through the network 10. When deciding which segments to use, we want to try to optimize the following criteria (note, when we say "optimize" the criteria, we do not necessarily mean optimize to a precise, perfect value, but rather to address in some fashion):

(1) Segment list depth: We prefer to use fewer segments when possible. Some devices have a limit to how deep of a segment list they can push into packets, so we have a better chance of supporting such devices if we opt for a shorter segment list over a deeper segment list.

(2) Resilience to failure: We prefer the segments in the segment list to still be expandable in the event of some routing failures in the network 10. While this might result in a temporary divergence of traffic from the intended path, it will still allow traffic to be forwarded, rather than dropped altogether during this transient period. This is the desired behavior for most services but not all. It is assumed that there will be a separate parallel attempt either by the head-end router of the segment routing policy or by the PCE 30 to detect this failure and implement a remedy. For example, the head-end may detect this failure using Seamless Bidirectional Forwarding Detection (S-BFD) and switch to a secondary candidate path.

(3) Resilience to repair and other changes: The expansion of a segment list is not just affected by network failures; network improvements and restorations can result in changes to how a segment list is expanded into a full path as well. For such cases, we do not need to worry about traffic dropping as we do in the case of failures, but we do still need to make sure that the expanded segment list still matches the original intended path when all links in the latter are still viable.

The first two criteria can be helped by preferring node SIDs over adjacency SIDs where possible (again, the present disclosure can use segment and SID interchangeably). We lessen segment list depth by allowing for node SIDs to cover multiple hops of a path with a single segment, whereas adjacency SIDs would require different segments for each hop in the path. We provide better resiliency to failure by routing to node SIDs, which will work as long as there is some connectivity between the current node and the node in question, as opposed to adjacency SIDs, which require specific links in the network 10 to still be up.

However, this same flexibility for node SIDs works against the third criteria. While the expansion of a node segment might fit our desired path when we create the segment list, other changes to the network 10 might cause the expansion of the node segment to take a better, hence different, path at a later time. The flexibility is a double-edged sword; upon failure of a link in the desired path, it allows us to take another path, which if done for a limited amount of time is preferable to dropping traffic; upon other changes, though, it may cause us to take a path other than the desired path, which is not preferable when all links in the desired path are still up; one has to decide which of these is more important.

For example, we can specify a single segment, namely a node SID for the network element 12Z. The problem here is we are not sure that a given packet would take the path 14 (intended) or the path 16. Now, in situations where we want to guarantee the same path, such as in circuit-style transport, the conventional approach is to use adjacency segments where each hop is explicitly stated, and while this has resilience, there are a large number of segments. This avoids unintended consequences of link repairs, but fails to compress the SID list, and is not feasible for many Commercial off-the-shelf (COTS) routers due to segment depth limit.

Another approach where there is segment compression is to have the SDN controller 20 or the PCE 30 monitor the network. In the event that links are restored, and that the restoration of such links affect segment expansion, so that the segments no longer expand to their intended path, then the SDN controller 20 or the PCE 30 will need to re-compute the segment lists for the desired path 14. This approach requires continually monitoring the network 10 for such link restorations and identifying those which might affect segment expansion. Additionally, there is a much larger delay between the restoration and fixing all the impacted paths, accounting for link state propagation and heavy computation for all affected segments. This delay is not acceptable for the circuit-style Segment Routing transport service.

PCE

Figure 4:
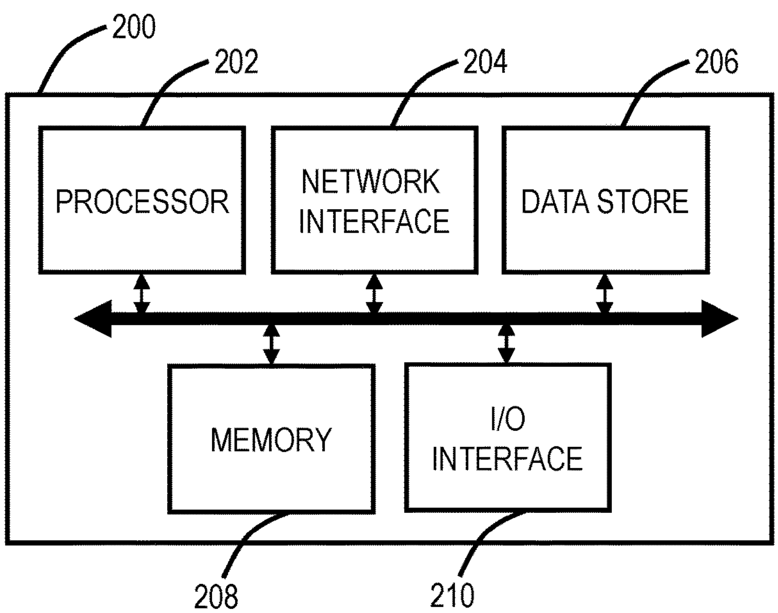
FIG. 4 is a block diagram of an example processing device.

The PCE 40 is a processing device that handles traffic engineering in Segment Routing. The official definition of a PCE is an entity (component, application, or network node) that is capable of computing a network path or route based on a network graph and applying computational constraints. The PCE is responsible for doing the path computation and then sending appropriate label-stack (SID labels) to the headend node. Then the headend node pushes those segments list labels on the packets. An example embodiment of a PCE is illustrated in FIG. 4. Note, the PCE can be a server, an application, a management system, a controller, etc. The present disclosure provides a segment compaction process that can be used by the PCE 30 or some other device to assign segments to an already computed path.

Objective

The present disclosure addresses the three criteria, (1) Segment list depth, (2) Resilience to failure, and (3) Resilience to repair and other changes, in providing a segment list to match a desired path. We show that this segment list is resilient while having a reduced depth. By resilient, we mean there is not a need for the SDN controller 20 or PCE 30 to actively monitor a service to guarantee it is on its intended path. This is advantageous for circuit services, traffic engineering, etc., and for reducing processing on the SDN controller 20 or PCE 30. By reduced depth, we mean the number of segments is less than or equal to the number of hops, i.e., the number of segments if the segment list was all adjacency segments.

This is accomplished by making one assumption and one preference in the segment compaction, i.e., the segment assignment process, namely:

(1) an assumption of treating all links in the Segment Routing network as up before performing segment compaction, i.e., any down links are treated as being restored for purposes of segment compaction, and (2) a preference of attempting to use a node segment to cover as much of the desired path as possible from a current node, and using an adjacency segment only if necessary.

This approach addresses resiliency to link restorations by confirming that restoration of the down links in the network 10 will not affect how each node segment expands. If we cannot confirm that a node segment will not be affected by such restorations, we will choose to not use it ahead of time, opting for another node segment covering a shorter span of the desired path or opting for an adjacency segment if such a shorter node segment does not exist. This allows the PCE 30 or SDN controller 20 to be sure such link restorations will not cause the expanded path to divert from the desired path, meaning the PCE 30 or SDN controller 20 will not need to continually monitor the network 10 for such affecting link restorations.

Regarding resilience to other changes in the network 10, new links could be added between any two nodes in the network; trying to protect against all of those possible link additions is not reasonable as a result. Similarly, link attribute changes such as metric, SRLG values, affinity, etc. could occur on any existing link in the network; additionally, different magnitudes of changes in the metrics may have different impacts, making the number of cases we need to look at here all the more complex; once again, trying to protect against all of those possible link attribute changes is also not reasonable as a result. Most of these changes, with the exception of restoration of down links, are typically done in maintenance windows and under the supervision of the SDN controller 20, a Network Management System (NMS), an Element Management System (EMS), etc. (collectively a management system). By doing these operations under the supervision of the management system, the management system can work around their impacts on paths before making them. Hence these kinds of changes are not the focus of the segment compaction.

Examining the impact of the restoration of down links in the network 10 is more tractable. We should already know the set of down links in the network 10, so we are limited to looking at restorations on just those links. We can also assume that if the restoration of any of these links would affect the expansion of the node segment on its own, then it will still affect the expansion of the node segment when done in conjunction with all of the other restorations. Thus, we can test the node segment expansion against all of the link restorations at once, lessening the overall number of restoration tests we need to do to one. Beyond that, we can go even one step further and do our entire segment compaction with all of the down links temporarily restored. While we compute our desired path without any changes to the network 10, i.e., the path is computed considering the current state of the network (bandwidth, which links are up/down, etc.), when it comes time for segment compaction, we temporarily restore all down links in the model of the network in our approach.

We are basically saying we would like to see what the segment compaction of our desired path would be when every down link is restored, so that our segments still correctly expand to the desired path, without any changes needed, even if any of the links happen to get restored in the meantime. When all such links are restored, there are more links in the network that could be used by the expanded path, which means more opportunity for the expanded path to diverge from the computed path. Assigning a segment list based on this state ensures us the segment list least likely then to diverge from our computed path. It also means we do not have to worry about which particular links are restored or in which order, as restoring all links already takes us directly to the most resilient solution. We found that using this assumption, traffic is most likely to remain on the computed path which is represented by a compressed segment list that assumed all links were restored, even if they were down when the path was computed. That is, the compressed SID list plus this assumption during segment assignment allows us to avoid adjacency segments (i.e., SID for each hop) and avoid ongoing monitoring (i.e., to determine the service is/is not on the computed path).

Segment Compaction Process

Figure 2:
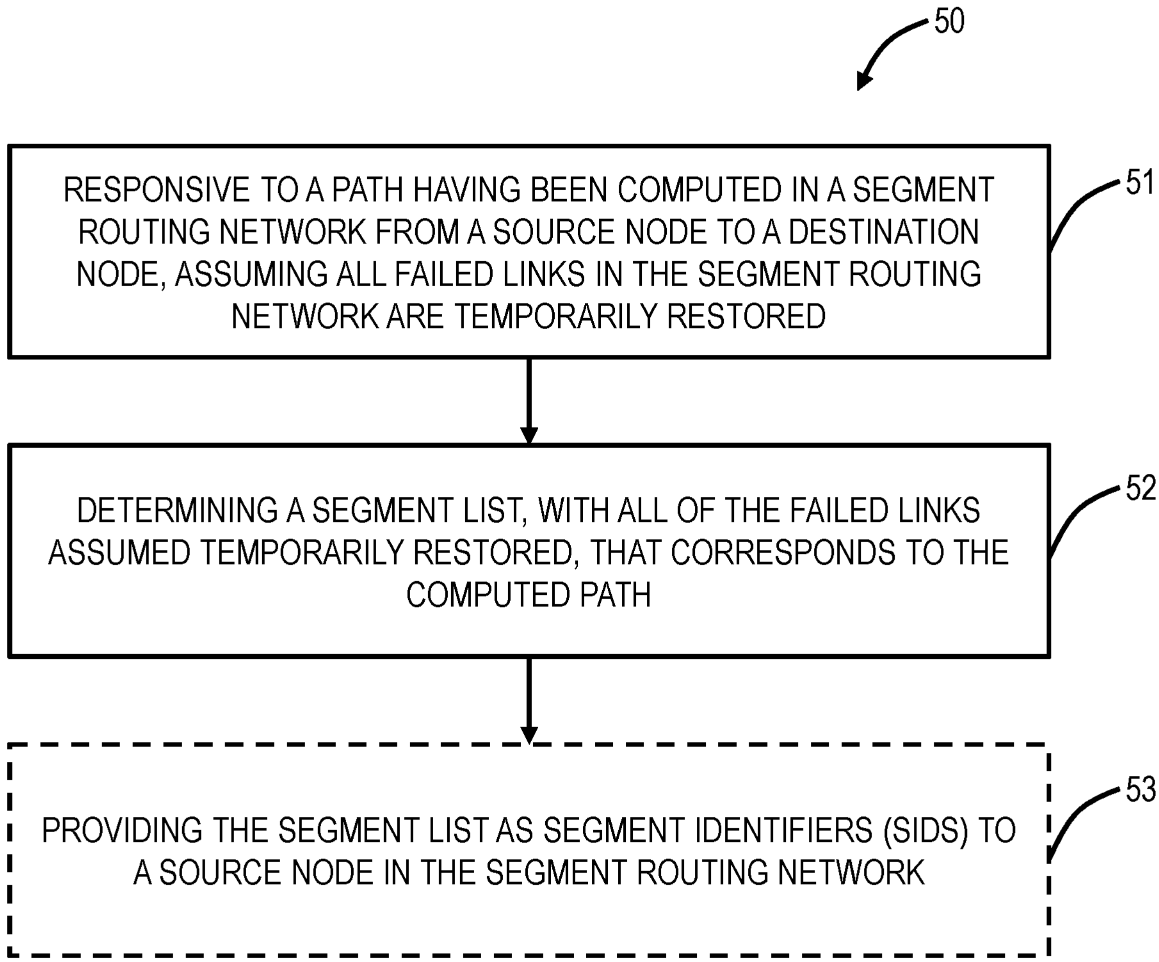
FIG. 2 is a process for segment compaction according to an embodiment of the present disclosure.

FIG. 2 is a process 50 for segment compaction according to an embodiment of the present disclosure. The process 50 can be realized as a method having steps; via an apparatus such as a processing system disposed in, associated with, or connected to a router, with the processing system including at least one processor configured to implement the steps; and as a non-transitory computer-readable medium storing instructions that, when executed by at least one processor, cause the at least one processor to implement the steps.

The process 50 includes, responsive to a path having been computed in a Segment Routing network from a source node to a destination node, assuming all failed links in the Segment Routing network are temporarily restored (step 51); and determining a segment list, with all of the failed links assumed temporarily restored, that corresponds to the computed path (step 52). The process 50 can include providing the segment list as Segment Identifiers (SIDs) to a source node in the Segment Routing network (step 53). The path can be for a circuit-style service in the Segment Routing network. The determining step 52 can include preferring node segments over adjacency segments to match the computed path.

The determining of the segment list is performed by traversing the computed path from a current node to determine a furthest node segment available matching a corresponding section of the computed path, and, if a furthest node associated with the furthest node segment is not the current node, utilizing the furthest node segment in the segment list. If the furthest node is the current node, the determining of the segment list includes selecting an adjacency segment matching a next node from the current node in the computed path.

In an embodiment, the determining of the segment list includes a) from a current node that starts with the source node, traversing the computed path to determine a furthest node segment available matching a corresponding section of the computed path;

(b) if a furthest node associated with the furthest node segment is not the current node, utilizing the furthest node segment in the segment list; and (c) if the furthest node is the current node, utilizing an adjacency segment to get to a next node in the computed path; and (d) setting the current node to be the furthest node or the next node, and repeating (a)-(c) until the furthest node or the next node is the destination node The process 50 can further include assuming a service for the computed path is on the computed path for traffic engineering purposes, without continually monitoring the service to ensure it is on the computed path.

Algorithm

The following provides code for describing further details of the segment compaction process.

```
struct Hop {
   Node fromNode;
   Node toNode;
   Intf fromIntf;
   Intf toIntf;
}
list<Hop> path = <intended path, computed by CSPF satisfying
constraints>;
set<Link> downLinks = <down links in network>;
list<Segment> segments;
// Temporarily restore all down links
foreach (downLink in downLinks) {
   bringUp (downLink);
}
Hop curHop = path.begin( );
Hop endHop = path.end( );
while (curHop != endHop) {
   // Try Node-SID first
   // Start with just the current hop for the current node and the Node-SID
   // node
   seqBeginHop = curHop;
   seqEndHop = curHop;
   Segment nodeSIDSegment;
   // While we have not reached the end of the path
   while (segEndHop != endHop) {
      nodeSIDSegment = getNodeSIDSegment(seqEndHop.toNode);
      // Get the path from the current node to the Node-SID node
      list<Hop> segmentPath = getNodeSIDPath(seqBeginHop.fromNode,
            seqEndHop.toNode);
      // If they are a different path, stop
      bool match = comparePaths(seqBeginHop, seqEndHop,
      segmentPath);
      if (!match)
         break;
      // If the paths match, the Node-SID for this end hop works, so try
      // moving the Node-SID node one hop further
      ++segEndHop;
   }
   // If we moved at least one hop forward with the Node-SID segment,
   add
   // that segment to the segment list and move to that point in the path
   if (curHop != segEndHop) {
      segments.add(nodeSIDSegment);
      curHop = segEndHop;
      continue;
   }
   // Try Adj-SID next
   // Add the Adj-SID segment to the segment list, move to the next hop in
   // the path
   Segment adjSIDSegment = getAdjSIDSegment(curHop.fromNode,
   curHop.toNode,
         curHop.fromIntf, curHop.toIntf);
   segments.add(adjSIDSegment);
   ++curHop;
}
// Place the down links back down
foreach (downLink in downLinks) {
   bringDown(downLink);
}
```

Example Operation

Each hop in the path is an interface pair; we have the node and interface information for the source, S, and destination, D, of each hop in the path.

We start with the first hop in the path, which will be our current hop, C. At that current hop, we consider a sequence, Sh, of hops in the path; at the start, that sequence of hops is just the current hop (Sh=[C, C]). For Sh, we attempt to find the shortest path, Pseg, from the source node of the first hop in Sh, S, to the destination node of the last hop in Sh, D. By doing this, we are seeing what the result would be for following the node SID from S to D. When we find Pseg, we compare it to the interfaces in the sequence Sh, Pospf. If these two paths are the same, then we know that the path we use to follow the node SID from S to D will match that section of the path we are trying to find segments for. For reasons mentioned above, if we can use the node segment to get us over a section of the path, we prefer that over any adjacency segments.

If we are able to find a node segment for Sh when Sh=[C, C], then we next want to try to find a node segment for [C, C+1]. If that succeeds, we are now able to cover two hops from C in the path with a single node segment. We then try [C, C+2], and so on. We go for as long as the path from S to D's node SID matches the hops in that section of the path. If we are able to cover at least one hop in this way, we add that segment to the resulting segment list. We then set our current hop, C, to be the first hop after the sequence Sh, and we start the process again from there, to see how we can traverse the rest of the path.

If we were not able to cover any hops using the node SID, we need to do something to move on from C. In that case, we will use the adjacency SID for the source interface in C. This at least pushes us to the next hop in the path, so we add that segment to the segment list and set C to C+1. We can then start the process again from there, to see how we can traverse the rest of the path.

For both cases, we stop once we reach the end of the hops in the path. The best case is that the entire path is covered by a single node segment. The worst case is that we need an adjacency segment for each hop in the path, where best and worst refers to number of segments.

Note we have not handled resilience to restoration yet. To do that, we have to temporarily bring up all down links in the network before we start the segment compaction process. We then run the entire segment compaction process described above and get the resulting segment list. After we get the resulting segment list, we bring the down links back down, so that our network model is back to the same state it was originally in. Since the compaction was done with all of the links temporarily restored, if any of these links happen to come up later, they will not affect the segment expansion, since we purposefully found segments that are resilient to such restorations. In effect, we are enforcing our segments to be shortest paths between the segment begin and end routers both during and after the restorations.

Example Node

Figure 3:
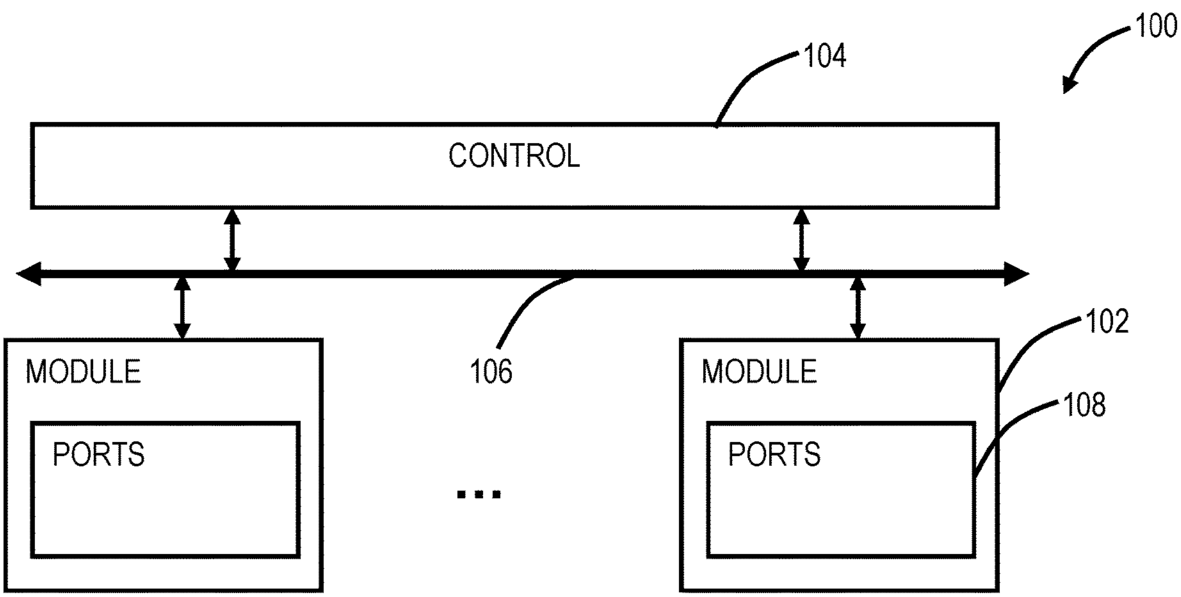
FIG. 3 is a block diagram of an example implementation of a router.

FIG. 3 is a block diagram of an example implementation of a router 100. Those of ordinary skill in the art will recognize FIG. 3 is a functional diagram in an oversimplified manner, and a practical embodiment may include additional components and suitably configured processing logic to support known or conventional operating features that are not described in detail herein.

In an embodiment, the router 100 can be any network element or other implementations that support Segment Routing networking, include any of the network elements 12 in the network 10. In this embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, the PCE 30, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 3 is meant to provide a functional view, and those of ordinary skill in the art will recognize actual hardware implementations may vary.

Example Processing Device

FIG. 4 is a block diagram of an example processing device 200. The processing device 200 can be part of the router 100, or a stand-alone device communicatively coupled to the network element 100, such as the PCE 30, the SDN controller 20, etc. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A non-transitory computer-readable medium comprising instructions that, when executed, cause one or more processors, to perform steps of:

responsive to a path having been computed in a Segment Routing network including a plurality of nodes interconnected by links, wherein the computed path is from a source node to a destination node through one or more nodes, assuming all failed links of the links in the Segment Routing network are temporarily restored;

determining a segment list, with all of the failed links assumed temporarily restored, that corresponds to the computed path such that the segment list expands to the computed path before and after restoration of any of the failed links; and providing the segment list as Segment Identifiers (SIDs) to the source node in the Segment Routing network for establishing the path therein, wherein the assuming all failed links are temporarily restored allows a Path Computation Element (PCE) or a controller to not continuously monitor and recalculate segment lists in response to restoration events in the Segment Routing network.

2. The non-transitory computer-readable medium of claim 1, wherein the determining includes preferring node segments over adjacency segments to match the computed path.

3. The non-transitory computer-readable medium of claim 1, wherein the path is for a circuit-style service in the Segment Routing network.

4. The non-transitory computer-readable medium of claim 1, wherein the determining the segment list is performed by traversing the computed path from a current node to determine a furthest node segment available matching a corresponding section of the computed path, and, if a furthest node associated with the furthest node segment is not the current node, utilizing the furthest node segment in the segment list.

5. The non-transitory computer-readable medium of claim 4, wherein, if the furthest node is the current node, the determining the segment list includes selecting an adjacency segment matching a next node from the current node in the computed path.

6. The non-transitory computer-readable medium of claim 1, wherein the determining the segment list includes:

(a) from a current node that starts with the source node, traversing the computed path to determine a furthest node segment available matching a corresponding section of the computed path;

(b) if a furthest node associated with the furthest node segment is not the current node, utilizing the furthest node segment in the segment list;

(c) if the furthest node is the current node, utilizing an adjacency segment to get to a next node in the computed path; and (d) setting the current node to be the furthest node or the next node, and repeating (a)-(c) until the furthest node or the next node is the destination node.

7. The non-transitory computer-readable medium of claim 1, wherein the steps further include:

assuming a service for the computed path is on the computed path for traffic engineering purposes, without continually monitoring the service to ensure it is on the computed path.

8. An apparatus comprising:

at least one processor, and memory storing instructions that, when executed, cause the at least one processor to:

responsive to a path having been computed in a Segment Routing network including a plurality of nodes interconnected by links, wherein the computed path is from a source node to a destination node through one or more nodes, assuming all failed links of the links in the Segment Routing network are temporarily restored;

determine a segment list, with all of the failed links assumed temporarily restored, that corresponds to the computed path such that the segment list expands to the computed path before and after restoration of any of the failed links; and provide the segment list as Segment Identifiers (SIDs) to the source node in the Segment Routing network for establishing the path therein, wherein the assuming all failed links are temporarily restored allows a Path Computation Element (PCE) or a controller to not continuously monitor and recalculate segment lists in response to restoration events in the Segment Routing network.

9. The apparatus of claim 8, wherein the segment list is determined by preferring node segments over adjacency segments to match the computed path.

10. The apparatus of claim 8, wherein the path is for a circuit-style service in the Segment Routing network.

11. The apparatus of claim 8, wherein the segment list is determined by traversing the computed path from a current node to determine a furthest node segment available matching a corresponding section of the computed path, and, if a furthest node associated with the furthest node segment is not the current node, utilizing the furthest node segment in the segment list.

12. The apparatus of claim 8, wherein the segment list is determined by (a) from a current node that starts with the source node, traversing the computed path to determine a furthest node segment available matching a corresponding section of the computed path, (b) if a furthest node associated with the furthest node segment is not the current node, utilizing the furthest node segment in the segment list, (c) if the furthest node is the current node, utilizing an adjacency segment to get to a next node in the computed path, and (d) setting the current node to be the furthest node or the next node, and repeating (a)-(c) until the furthest node or the next node is the destination node.

13. The apparatus of claim 8, wherein the instructions that, when executed, further cause the at least one processor to:

assume a service for the computed path is on the computed path for traffic engineering purposes, without continually monitoring the service to ensure it is on the computed path.

14. A method comprising steps of:

responsive to a path having been computed in a Segment Routing network including a plurality of nodes interconnected by links, wherein the computed path is from a source node to a destination node through one or more nodes, assuming all failed links of the links in the Segment Routing network are temporarily restored;

determining a segment list, with all of the failed links assumed temporarily restored, that corresponds to the computed path such that the segment list expands to the computed path before and after restoration of any of the failed links; and providing the segment list as Segment Identifiers (SIDs) to the source node in the Segment Routing network for establishing the path therein, wherein the assuming all failed links are temporarily restored allows a Path Computation Element (PCE) or a controller to not continuously monitor and recalculate segment lists in response to restoration events in the Segment Routing network.

15. The method of claim 14, wherein the segment list is determined by preferring node segments over adjacency segments to match the computed path.

16. The method of claim 14, wherein the determining the segment list is performed by traversing the computed path from a current node to determine a furthest node segment available matching a corresponding section of the computed path, and, if a furthest node associated with the furthest node segment is not the current node, utilizing the furthest node segment in the segment list.

17. The method of claim 14, wherein the determining the segment list includes:

(a) from a current node that starts with the source node, traversing the computed path to determine a furthest node segment available matching a corresponding section of the computed path;

(b) if a furthest node associated with the furthest node segment is not the current node, utilizing the furthest node segment in the segment list;

(c) if the furthest node is the current node, utilizing an adjacency segment to get to a next node in the computed path; and (d) setting the current node to be the furthest node or the next node, and repeating (a)-(c) until the furthest node or the next node is the destination node.

* * * * *